Feb. 10, 1970

K. L. PAAPE 3,495,135

ELECTRICAL CONTROL CENTER STRUCTURE HAVING SYMMETRICAL PARTS

Filed Dec. 11, 1967

INVENTOR.
KENNETH L. PAAPE

BY *William H. Schmeling*

FIG. 10

INVENTOR.
KENNETH L. PAAPE
BY William H. Schmeling

United States Patent Office 3,495,135
Patented Feb. 10, 1970

3,495,135
ELECTRICAL CONTROL CENTER STRUCTURE
HAVING SYMMETRICAL PARTS
Kenneth L. Paape, Mequon, Wis., assignor to Square D
Company, Park Ridge, Ill., a corporation of Michigan
Filed Dec. 11, 1967, Ser. No. 689,412
Int. Cl. H02b 1/02, 11/00, 1/06
U.S. Cl. 317—119          10 Claims

ABSTRACT OF THE DISCLOSURE

A modular control center structure wherein the vertical heights of a top wiring trough, a bottom wiring space and the doors for covering removable circuit controlling units have a precise mathematical relationship and the numerical difference between the heights of the top wiring trough and the bottom wiring space determines the heights of the circuit controlling unit spaces and the vertical distance between holes which are used to mount hinges for the doors.

Field of invention

This invention relates generally to electrical control center structures and more particularly, to an enclosure structure for housing apparatus of the type utilized for controlling distribution circuits connected to electric power utilizing devices.

Description of prior art

Well known apparatus of this class includes a freestanding enclosure containing a bus system. The bus system is connected to a major source of electrical power and a plurality of control units, including motor starters, circuit breakers and the like, mounted in separable housings, are inserted into the enclosure and connected to the bus system. The enclosure structure provides wiring channels or gutters for secondary wiring between the inserted control apparatus and the connected loads and is arraned so a plurality of the aforementioned enclosures may be grouped together and mechanically and electrically interconnected to form a control or distribution center.

Usually a plurality of independent devices of various sizes mounted in individual housings are mounted or "stacked" vertically in each enclosure with the control devices mounted in the separable housings which isolate the electrical equipment in the unit from others in the same enclosure. Each separable unit makes plug-in connection to the bus system. The enclosures are usually equipped with hinged doors which cover the openings in the enclosure through which the control units are accessible. The doors are "dead-front" and isolate the operating personnel from the switchgear and bus system within the enclosure. The operating controls for the various devices may be mounted on the door or the door may be provided with an opening through which the controls are accessible.

Additionally, control center structures are required to conform to industry standards, e.g., the National Electrical Manufactures Association Standards, as well as industry practices and the codes of governmental authorities. Also, to satisfy the wide variety of installational requirements, the control center structures should be capable of providing horizontal wiring spaces at both the top and bottom of the structure. In the interests of economy it is desirable that a maximum number of switching units be included in each vertical section and that each vertical section be assembled from a minimum number of separate parts to minimize the number of tools required to form the parts and the inventories required to satisfy the various combinations of switch gear requirements.

Control centers frequently are required to house switching devices of varying electrical capabilities depending upon the size and type of electrical load to be controlled by the respective devices. Thus for small sized loads, such as electric motors of ten horsepower or less, devices known as NEMA Size 1 starters are used, while larger size loads will require devices having higher electrical capabilities, such as NEMA Size 2, 3, 4 or 5 starters. Each of these different size starters will vary in physical size. In pricing and laying out control centers, engineers, architects, and those designing and pricing control centers for installations, have adopted the term "Space Factor" and have assigned space factor numbers to the various sized electrical apparatus which may be used in a control center. Thus a NEMA Size 1 starter has been accepted to occupy a space factor of one, while the larger type starters will require a larger number of space factors in the control center. Also, industry, under present practices, has standardized on 90 inches as the proper height for a control center and requires that the vertical bus bars be supported at intervals necessary to withstand short circuit stresses of varying magnitude, depending upon the supply to which the control center is connected.

A further complicating requirement is introduced by the Electrical Code of the State of California, which requires that the center of any operating handle not exceed 78 inches from the bottom of the control center when the handle is moved to its highest vertical position.

SUMMARY

As standards dictate the maximum height of a control center and the maximum height of any operating handle, and as industry practices require that the control centers be capable of providing horizontal wiring troughs at both the top and bottom of the control centers, the control center enclosure structure according to the present invention satisfies these requirements. Additionally, as control centers are priced, and the square feet of floor area allotted, according to the number of space factors required, it is frequently desirable to assemble the maximum number of switching devices in a structure occupying a minimum floor space and to provide space at both the top of the enclosure for horizontally extending wires, as well as to use a minimum number of different parts in the structure so as to realize economies in manufacture and inventories. In the electrical enclosure according to the present invention, the foregoing industry standards and requirements, as well as the economies, are achieved by optimizing the location of selected openings in the members forming the side walls of the enclosure that is dependent upon the difference in height between the wiring spaces at the top and the bottom of the structure when the top and bottom wiring spaces are unequal.

It is an object of the present invention on to provide a control center structure which will: comply with industry practices and codes, accept a maximum number of vertically stacked switching unit housings in each control center section, have horizontal wiring troughs of unequal height at the top and bottom of the structure and a wiring trough extending verticaly along one side wall of the structure, satisfy the code requirements governing the maximum height of the operators for the switching devices in the switch unit housing, provide members forming vertically extending outer wal portions of the structure with holes located at centers vertically spaced at intervals dictated by the mathematical difference between the heights of the top and the bottom wiring troughs and to use the holes to mount hinges for doors covering access openings to the switching units in the structure and the vertical wire trough.

Another object is to provide a control center structure which will comply with industry practices and codes, will accept a maximum number of vertically stacked switching unit housings in each control center section, have horizontal wiring troughs of unequal height at the top and the bottom of the structure and a wiring trough extending vertically along one side wall of the structure, to satisfy the State of California code requirement governing the maximum height of the operators for the switching devices in the switch unit housing, members forming vertically extending wall portions of the structure with holes for mounting the means for supporting the switch unit housings and to locate the holes in the members at centers vertically spaced at intervals dictated by the mathematical difference in heights of the top and the bottom wiring troughs.

An additional object is to provide a control center structure which will comply with industry practices and codes, will accept a maximum number of vertically stacked switching unit housings in each control center section, have horizontal wiring troughs of unequal height at the top and the bottom of the structure and a wiring trough extending vertically along one side wall of the structure, to satisfy the State of California code requirement governing the maximum height of the operators for the switching devices in the switch unit housing, members forming vertically extending wall portions of the structure with holes for mounting the means for maintaining the spacing between the vertical bus bars of the structure and to locate the holes in the members at centers vertically spaced at intervals dictated by the mathematical difference in heights of the top and the bottom wiring troughs.

Further objects and features of the invention will be readily apparent to those skilled in the art from the specification and appended drawing illustrating certain preferred embodiments in which:

Figures 1, 2:
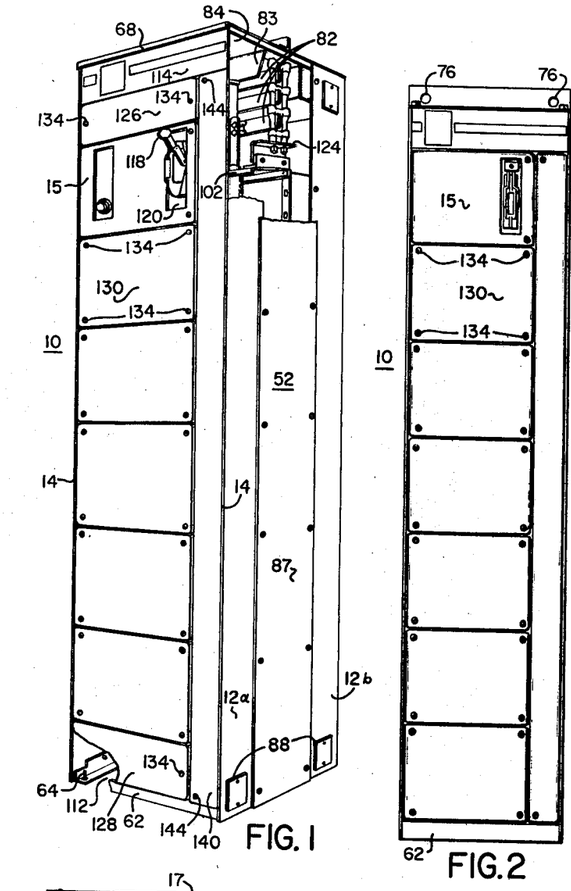
FIG. 1 is front perspective view of a modular control center cabinet incorporating the features of the present invention.
FIG. 2 is a front view of a modified form of the cabinet shown in FIG. 1.

Referring to the drawings, and particularly to FIG. 1, a vertical section of an electrical enclosure structure 10 shown is also illustrated in United States Design Patent No. 212,951, issued Dec. 17, 1968. The structure 10 provides a support and an enclosure for a plurality of individually vertically stacked separable protective and control units each included in a cell that is covered by a door indicated by a numeral 15. If desired, spaces or cells within the structure 10 which are not occupied by control units may be closed by covers designated by the numeral 130. As is well known, a plurality of sections each including a structure 10 may be assembled side by side in a group usually referred to as a control center.

Figures 4, 5:
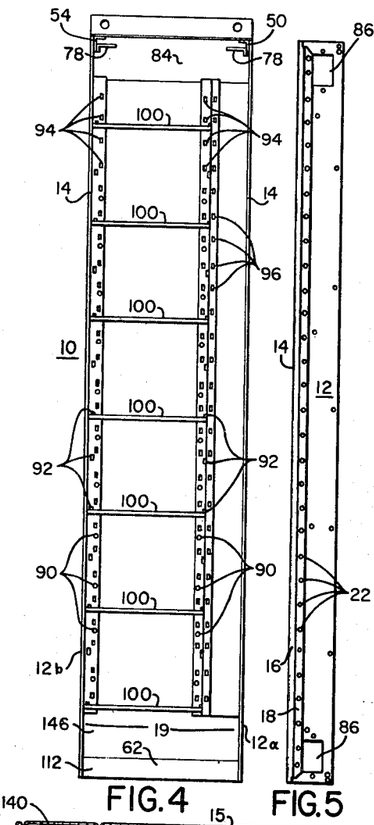
FIG. 4 is a modified form of the structure shown in FIG. 3.
FIG. 5 is a side view of a side plate as used in the cabinet in FIG. 1.
Figure 6:
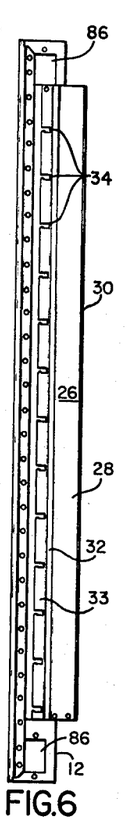
FIG. 6 is a side view of a left front side wall assembly of the cabinet in FIG. 3 as viewed in the direction of the arrow 6.
Figure 7:
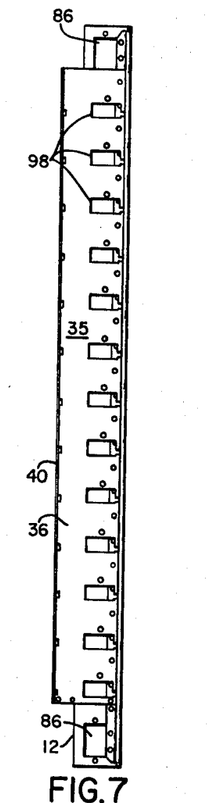
FIG. 7 is a side view of a right front side wall assembly of the cabinet in FIG. 3 as viewed in the direction of the arrow 7.
Figure 8:
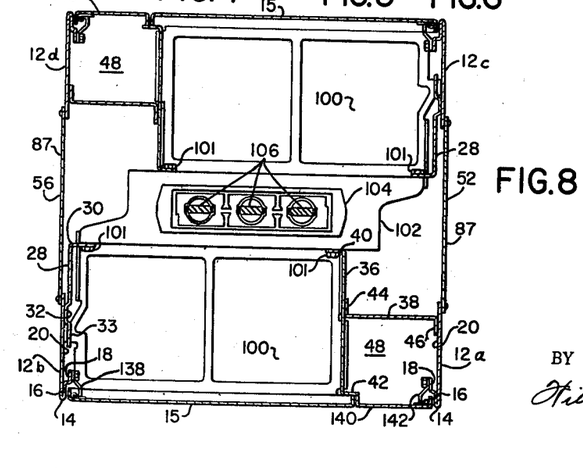
FIG. 8 is a cross sectional view taken in the direction of arrows 8—8 in FIG. 3.
Figure 9:
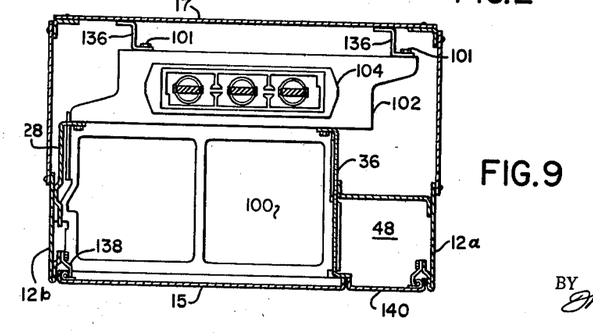
FIG. 9 is a cross sectional view showing a structure similar to that shown in FIG. 8 when the cabinet is arranged to have only front accessible units.
Figure 10:
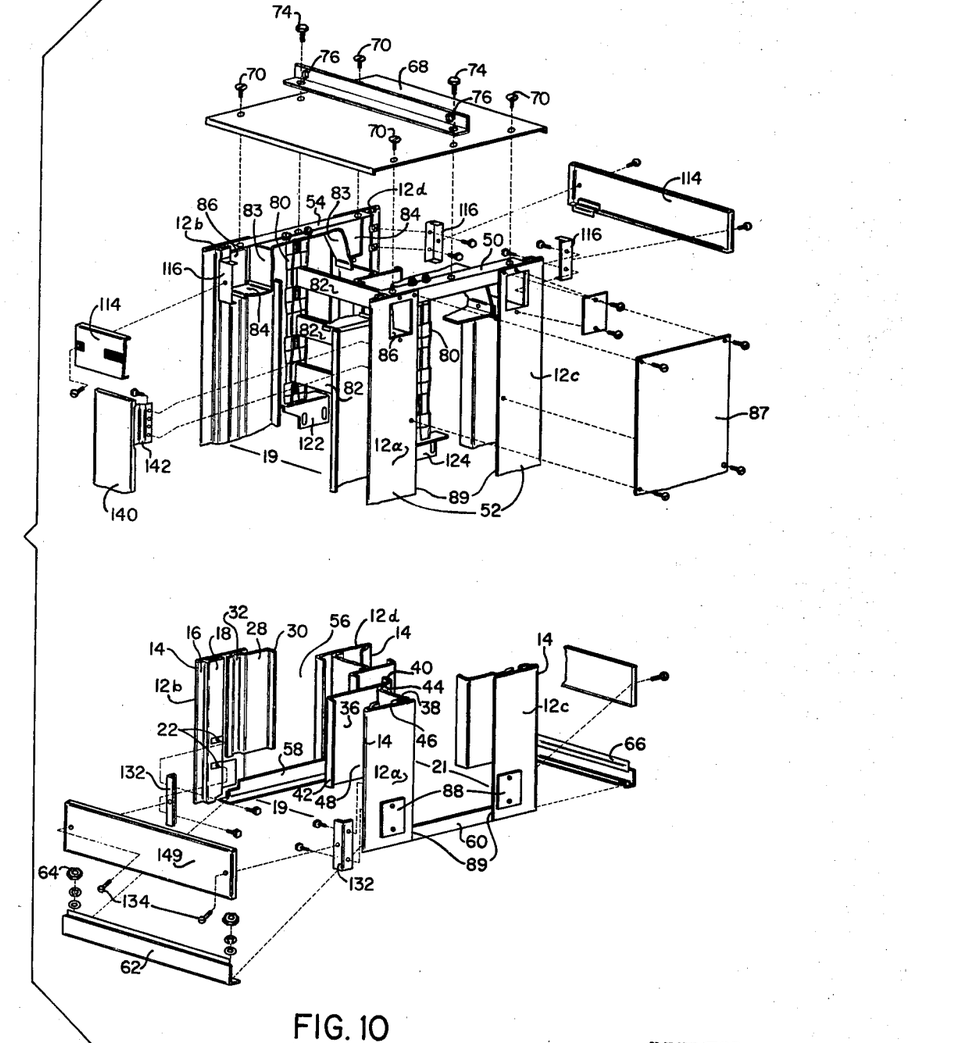
FIG. 10 is an exploded view showing in perspective components of the structure in FIG. 1 with a central portion of the structure broken away.

The electrical control center section structure 10, shown in FIG. 1, is arranged as a back-to-back assembly as shown in FIG. 8, which has doors 15 opening at the front and rear of the structure 10. If required, the structure 10 may be arranged as illustrated in FIG. 9, wherein hinged doors 15 are provided only at the front of the structure and a rear wall is provided by a metal panel 17. Referring to FIGS. 1, 8, and 10, the structure 10 includes four identical vertical members or side plates 12, shown in FIG. 5, which provide an edge for the respective corners and a portion of the sidewalls of the structure 10. The side plates 12 at the respective corners are designated as 12a, 12b, 12c and 12d. Each of the side plates 12 is formed by folding a portion of the material of the side plate 12 back upon itself to provide a rolled edge 14, a flange 16 and a surface 18 which extends from the flange 16 to be spaced from a wall portion 20 of the member 12. Included in the surface 18 are a plurality of vertically aligned openings 22 which are spaced equidistantly from each other at centers which wil be later described. The side plates 12a and 12c, which are located at the corners of a front of the structure 10, are horizontally spaced and extend vertically to define a vertical front opening 19 and face in opposite directions with the rolled edges 14 of the members 12a and 12b facing in the same direction. To accomplish the positioning of the side plates 12a and 12b as described, each side plate 12 is formed to be symmetrical about its vertical center so that when the side plates 12a and 12b are vertically inverted relative to each other to be positioned as described, they will present mirror images of each other. The edges 14 of the side plates 12c and 12d, which are at the rear corners of a rear vertical opening 21 of the structure 10, face in the opposite direction from the edges 14 on side plates 12a and 12c also present mirror images of each other. The side plates 12, as shown in FIG. 5, are combined with other vertically extending members to form the assemblies shown in FIGS. 6, 7 and 10. The assembly 26, shown in FIGS. 6 and 10, is used at the left front and the right rear of the structure and includes a member 12 and a member 28. The member 28 has an inwardly turned continuous flange 30 along a rear marginal edge and a continuously extending idented portion 32 secured by riveting or welding to the inner wall 20 of one of the side plates 12. The indented portion 32 is located in the members 28 to provide a continuous portion 33 that extends parallel to the wall 20 and forwardly toward and spaced from the surface 18. Located in the position 33 are a plurality of notches 34 which are vertically spaced equidistantly at intervals to be later described. The assembly 35, shown on FIGS. 7 and 8, which is used at the right front and left rear of the structure in FIGS. 1, 8 and 10, includes a member 12, a member 36, and a member 38. The member 36 is formed as a unitary vertically extending part having an inwardly turned flange 40 at its rear marginal edge and a flange 42 turned outwardly at a front edge. The member 38 has a pair of oppositely turned flanges 44 and 46 respectively secured to the members 36 and 12 to provide a rear wall for vertical wire troughs 48 extending between the members 36 and 12 at the corners provided by the side plates 12a and 12d in FIG. 8.

Referring to FIG. 10, secured to the inner wall surfaces at the top edges of the side plates 12a and 12c in FIG. 1 is an angle member 50 which maintains the top edges of side plates 12a and 12c spaced from each other to form portions of the right side wall 52 of the structure 10. The top edges of the side plates 12b and 12d are similarly maintained in spaced relation by an angle member 54 to form a left side wall 56. Similarly secured to the inner wall surfaces at the bottom edges of the side plates 12b and 12d is an angle member 58 which maintains the bottom edges of members 12b and 12d spaced from each other to form portions of the left side wall 56 of the structure 10. The bottom edges of the side plates 12a and 12c are similarly maintained in spaced relation by an angle member 60 to form the right side wall 52.

Extending between the side walls 52 and 56 at the bottom edge of the opening 19 is an angle member 62 having its ends fastened to the angle members 58 and 60 by a suitable means, such as nuts and screws 64. Similarly extending between the side walls 56 and 52 across the bottom edge of the rear opening 21 between the side plates 12c and 12d is an angle member 66 having its ends fastened to the members 58 and 60 to maintain the bottom portion of the walls 56 and 52 horizontally spaced from each other. The top portion of the walls 56 and 52 are maintained in horizontal spaced relation by a cover member 68 which is fastened to the angle members 50 and 54 by screws 70. If desired, an additional angle member 72 may be secured on the top surface of the cover member 68 by screws 74 that are threaded into the angle members 50 and 54. The angle member 72, when used, is provided with lifting eyelets designated by the numeral 76. Suitably secured to the angle members 50 and 54, as by welding, are horizontal bus support members 78, shown in FIG. 4. The members 78 are provided with openings to receive rods carrying insulating members 80 which support the horizontal bus bars 82 at the top portion of the structure 10. Supported by the members 78 and extending toward the front and rear openings 19 and 21 is a structure 83 which provides horizontal wiring troughs 84 at the upper portions of the front and rear openings 19 and 21. The horizontal wiring troughs 84 are aligned with openings 86 formed at both the top and bottom portions of each of the side plates 12. The openings 86, which are equidistantly spaced from a vertical center at opposite ends of each side plate 12, may be closed by covers 88 when the end side walls of the structures 10 are exposed. As shown in FIG. 10, the free edges 89 of the side plates 12a–12c and 12b–12d are spaced from each other to provide a vertical opening therebetween which may be closed by suitable cover members 87.

As shown in FIG. 4, located in horizontal alignment in the flanges 30 and 40 are a plurality of openings 90 which are equidistantly spaced at vertically aligned centers located a predetermined vertical distance from each other, as will be later explained. Similarly located in the flanges 30 and 40 are a plurality of vertically extending horizontally aligned notches 92 each having a lower edge spaced vertically from the bottom edge of an adjacent notch a predetermined vertical distance, as will be later described. Additionally located in the flanges 30 and 40 are a plurality of horizontally aligned openings 94 which are equidistantly spaced at vertically aligned centers located a predetermined vertical distance from each other, as will be later described. Located in the flange 42 at vertically spaced centers located in horizontal planes passing through the openings 94 and 22 are openings 96. Also, as shown in FIG. 7, included in the member 36 are a plurality of wire passing openings 98 which are equidistantly spaced so the lower edges thereof are located a predetermined vertical distance from each other in horizontal alignment with the lower edges of the notches 34, as will be hereinafter explained. As disclosed in an application for United States Patent, Ser. No. 689,538, filed Dec. 11, 1967, and assigned to the assignee of the present invention, the notches 34 and 92 as well as the lower edge of the openings 98 are arranged to provide a support and guide for unit mounting pans designated by numeral 100 in the drawings. The unit mounting pans 100 define the vertically spaced cells within the structure 10 and provide a support for the control units when the control units are inserted into the structure 10. The pans 100 also serve to maintain the vertical spacing between the side plates 12a–12b and 12c–12d when the pans 100 are installed in the vertical openings 19 and 21.

Figure 3:
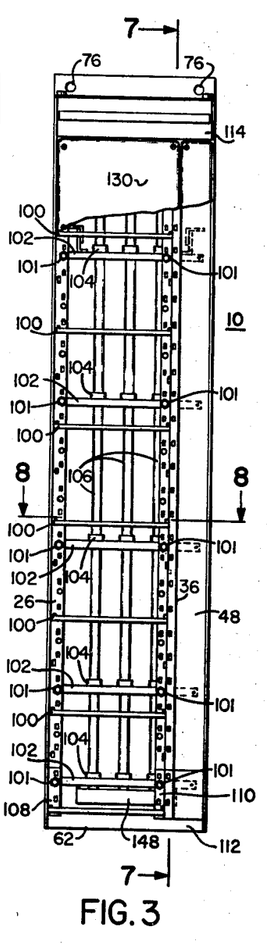
FIG. 3 is a front view of the cabinet in FIG. 2 with certain doors and covers for the structure removed.

As shown in FIGS. 3 and 8, secured rearwardly of the flanges 30 and 40 by four suitable screws 101 passing through selected openings 90 are a plurality of vertically spaced members 102 that extend horizontally and maintain the horizontal spacing between the members 28 and 36 of the structure 10. The members 102, as shown in FIGS. 3 and 8, each is formed as a U-shaped channel having a pair of spaced flanges extending from a bight portion that is apertured to receive an insulating block 104. Extending through spaced apertures in the insulating blocks 104 are three spaced bus bars 106 which extend vertically and are electrically connected and mechanically supported by the horizontal bus bars 82.

As shown in FIG. 3, when the structure 10 is required to accommodate a maximum number of vertically stacked switching units, additional members 108 and 110 may be secured to the lower end of the members 26 and 36 to extend the members 26 and 36 so their lower ends are substantially horizontally aligned with the top edge of the members 62 and 66. Thus the wire troughs 48 are extended and terminate in a plane passing through the top edges of the members 62 and 66 and when a unit mounting pan 100 is installed in the notches and the openings provided by the extensions of the members 26 and 36, a space for a lower wire trough 112 will be provided to the rear of the angle member 62 between the lower surface of the mounting pan 100 and the surface supporting the structure 10. The space provided by the lower wire trough 112 may be used for horizontal wiring between the vertical wiring troughs 48 at the lower end of the structure 10 with the height of the wire trough 112 being defined by the height of the member 62, designated as B inches. The control unit in a cell directly above the space 112 will be positioned above the floor on which the structure 10 is mounted and thus be protected from damage by fluids and foreign matter.

As shown in FIG. 10, entry to the horizontal wiring troughs 84 at the upper portion of the openings 19 and 21 is closed by a cover member 14. The horizontal wiring trough 84 has a height greater than B inches and designated as T inches. The cover members 114 each are secured to enclose the top portions of openings 19 and 21 by removable screws that are threaded to a pair of brackets 116. The brackets 116 are secured to the side plates 12 by screws extending into threaded fastners carried in the two adjacent openings 22 at the extreme upper portions of each side plate 12.

Present industry practices and the National Electrical Manufacturers Association Standards dictate that the height of a control center shall be 90 inches, and the State of California has a code requirement that the maximum height of the center of a handle 118 in FIG. 1, which operates a switching device such as a disconnect switch in the control unit at the highest upper portion of the structure 10, shall not exceed 78 inches from the base of the structure 10.

Control centers frequently are required to house switching devices of varying electrical capabilities depending upon the size and type of electrical load to be controlled by the respective devices. Thus for small sized loads, such as electric motors of ten horsepower or less, devices known a NEMA Size 1 starters are used while larger size loads will require devices having higher electrical capabilities, such as NEMA Size 2, 3, 4 or 5 starters. Each of these different size starters will vary in physical size. In pricing and laying out control centers, engineers, architects, and those designing and pricing control centers for installations have adopted the term "Space Factor" and have assigned space factor numbers to the various sized electrical apparatus which may be used in a control center. Thus a NEMA Size 1 starter has been accepted to occupy a space factor of one, while the larger type starters usually will require more than one space factor.

A typical NEMA Size 1 starter is illustrated in an application for United States Patent, Ser. No. 473,299, filed July 20, 1965, by the inventors Joseph J. Gribble, Kenneth E. Marien and Harold E. Whiting, who assigned the same to the asignee of the present invention. It has been determined that for practical purposes seven NEMA Size 1 starter units of the type illustrated in the Gribble et al. application may be vertically positioned in the vertical openings 19 or 21 between the top wiring trough 84 and the bottom wiring trough 112. Thus the structure 10 is capable of providing seven vertical space factors. However, it is to be appreciated that larger size NEMA starters may require a vertical space greater than one space factor and less than two space factors. Thus if the height occupied by a NEMA Size 1 starter is considered as occupying two unit spaces with each unit space being equal to one-half space factor and having a height of U inches, control units having a height of a multiple of one-half space factor may be accommodated. If the maximum height of the structure 10 is limited to 90 inches, then the following equation will result: $T+B+14U=90$ inches. Referring to FIG. 1 the door 15, which closes the opening wherein the control unit operated by the handle 118 is installed, is provided with an opening 120 so the door 15 can be opened and closed when a switch handle 118 is at its highest vertical position. Thus clearance will be required between the top of the opening 120 and the top of the handle 118. In addition, the top of the door 15 through which the handle 118 extends must be provided with sufficient metal, e.g., ¾ inches, between the top of the opening 120 and the top of the door 15 to provide acceptable rigidity to the door 15.

If, for the purpose of meeting the California Code requirement, one unit space is allotted between the top wire trough 84 and the upper control unit having a handle 118, then the height of the top horizontal wiring trough 84 and unit space can be expressed as $$T+U+\tfrac{3}{4}=90-78=12$$

inches. Maximum use of tools which are used to form the side plates dictates that the side plates 12a–12b and 12c–12d be interchangeable on either side of the openings 19 or 21. Therefore it is necessary that all mounting openings, e.g., openings 22, as well as the openings 86 that are aligned with the wire troughs 84 and 112, must be symmetrical about the vertical center of the members 12. The obvious solution to the problem is to provide top and bottom horizontal wiring troughs of equal heights. However, as the lower wiring trough is used less frequently for wiring purposes than the top wiring trough and it is desirable to assure that the control unit at the bottom of the structure 10 is raised above the floor whereon the structure 10 rests to protect the lowest control unit from dirt and liquids, the height of the top wiring trough 84 is selected to be greater than the lower wiring trough 112. Thus the determination of the proper spacing between the holes 22 in the members 12 to make the members 12 interchangeable is complicated by the unequal heights of the wiring troughs 84 and 112. Additionally, as it is desirable that the hinges supporting a door covering each unit space be supported at two points or two adjacent holes 22, I have discovered that if the height of a unit space equals twice the difference between the heights of the wiring troughs 84 and 112, symmetrical holes in the side plates 12 are possible and the members 12 will be interchangeable and may be used at each of the corners of the structure 10. Thus the following three equations involving three unknowns are present:

$$T+B+14U=90$$
$$T+U+\tfrac{3}{4}=12$$
$$T-B=U/2$$

and solving provides that $U=5\tfrac{7}{8}$ inches, $T=5\tfrac{11}{32}$ inches, and $B=2\tfrac{13}{32}$ inches, with the spacing between the openings 22, 94, 96 being $2\tfrac{15}{16}$ inches and the vertical spacing between the openings 90, 98, the notches 34 and 92 being $5\tfrac{7}{8}$ inches.

As illustrated by FIGS. 1 and 10, the member 102 at the upper portion of the structure 10 immediately beneath the horizontal bus bars 82 has a pair of brackets 122 and 124 secured to its opposite ends. The brackets 122 and 124 provide a support and position the lower ends of the insulators 80 for the horizontal bus bar 82.

The openings 90 are equidistantly spaced at centers located at one unit space of $2(T-B)$ inches. This will permit the insulating block supports 104 for the vertical bus bars 106 to be vertically positioned one unit space apart or multiples thereof from each other. Thus depending upon the spacing between the insulating block supports 104, the bus bars 106 will be supported at selected vertical intervals to withstand a large range of short circuit stresses.

The bottom edges of the notches 92 in the flanges 30 and 40 are located in horizontal planes which are spaced one unit space apart, or $2(T-B)$ inches. The horizontal planes wherein the bottom edges of the notches 92 are located also extend through the bottom surfaces of the notches 34 and the openings 98 and are equidistantly spaced between horizontal planes passing through the openings 90. Thus the unit mounting pans 100 may be installed in the structure 10 one unit space apart or whole number multiples thereof at locations displaced from the positions of the members 102 which position the insulating support blocks 104.

The openings 22, 94 and 96 are located at centers ½ unit space apart or $(T-B)$ inches and are vertically displaced relative to the notches 92 so an opening 94 is located slightly above each notch 92. Thus each unit space will have a pair of openings 94 in each of the flanges 30 and 40 when a control unit one space unit high is installed in a cell in the structure 10, four openings 94 are available to secure the control unit to the flanges 30 and 42.

The openings 22 in the side plates 12 and the holes 96 in the flange 42 are preferably located in horizontal planes passing through the openings 94. Thus each unit space will have a pair of openings 22 and a pair of openings 96 which are provided to secure the cover and doors for the structure 10. As shown in FIG. 1, the structure 10 is provided with a cover 126 at its upper portion having a height of one unit space and a cover 128 at the bottom of the structure 10 which is also one unit space high while the remaining covers indicated by the numerals 130 are each two unit spaces high. Obviously, if desired, any of the covers 126, 128 and 130 may have a height equal to a whole number multiple of a unit space. Each of the covers 126, 128 and 130 has a side secured to the side plates 12 by suitable L-shaped brackets of the type indicated by the numeral 132 in FIG. 10. The brackets 132 are each positioned on the side plates 12 by screws and fasteners carried in a pair of adjacent openings 22. The covers 126, 128 and 130 are secured to the brackets 132 by means of suitable screws 134 which are threaded into openings in the brackets 132. The width of each cover 126, 128 and 130 is arranged so the covers 126, 128 and 130 each extend between the members 12 to have a portion thereof engaging the flange 42. The portion of the covers 126, 128 and 130 engaging the flange 42 is secured by suitable screws 134 which are threaded into fasteners carried in the openings 96. As shown, the covers 126 and 128 each are secured by a pair of screws 134 while covers 130, which have a height of two unit spaces, are secured by two pairs of screws 134. Obviously, if covers having heights greater than two unit spaces are employed, additional screws 134 may be employed.

Any of the covers 126, 128 or 130, shown in FIG. 1, may be replaced by a door 15 in the manner shown in Design Patent No. 212,951, supra. Thus the doors 15 may be one unit space high or whole number multiples thereof, as required. The doors 15 are provided to conceal and provide access to control units which are mounted on the unit mounting pans 100 included within the structure 10, as described. The doors 15 are each hinged on the side plates 12 with piano-type hinges 138, as shown in FIG. 8. When the door 15 has a height equal to one unit space, the piano hinge 138 will be secured to a side plate 12 at two points because of the presence of two holes 22 which are included in member 12 in each unit space. Thus each of the doors 15 will be hinged to the member 12 at at least two points. The doors 15 and covers 126, 128 and 130 are of equal width so that the doors 15 may be secured to the flange 42 by suitable screws 134 which extend fasteners carried in the openings 96 in the same manner as the screws 134 are used to secure the covers 126, 128 and 130 to the flange 42. The doors 15 and covers 126, 128 and 130 each have a vertical height slightly less than the number of unit spaces covered thereby so that when the covers and doors 15 are secured to close the vertical openings 19 and 21 the bottom edge of one door 15 or cover will be juxtaposed to the top edge of an adjacent door or cover. The structure 10 is also provided with a door 140 which vertically extends to conceal the vertical wiring trough 48. The door 140 is hinged on one side to a member 12 by means of suitable hinges 142 carried in the openings 22 in member 12 and has a width arranged so the door extends to engage the flange 42 in close proximity to the doors 15 and covers so that the exposed front and rear faces of the structure 10 presents a virtually uninterrupted appearance. The cover 140 is secured into position by screws 144 which are threaded into members, not shown, extending between the members 36 and 12.

In the structure 10 shown in FIG. 4 the extensions 108 and 110 are omitted. Thus the lower wiring trough, which includes the wiring space 112 as well as a unit space designated as 146, has a height of $U+B$ inches and extends completely across the lower portion of opening 19 between the members 12a and 12b. As shown in FIG. 10, the unit space 146 is concealed when a cover 149 is secured between the members 12a and 12b.

Additionally, in FIG. 4 it will be seen that the structure is capable of accommodating six NEMA Size 1 starter units, each requiring one space factor, an upper wiring trough 84 having a height of T inches and a single unit space at the top of the enclosure which is concealed by the cover 126, as in FIG. 1. The components which may be mounted in the single unit space include control transformers, relays and terminal strips which are not required to be accommodated in larger unit spaces. When the structure shown in FIG. 3 is employed, a bottom wiring space of B inches in height is provided to the rear of member 62 and a top wiring space having a height of T inches is provided behind the cover 114. The structure shown in FIG. 3 will accommodate seven control units each requiring a single space factor so that seven NEMA Size 1 starter units could be vertically positioned in the structure. Additionally, as shown in FIG. 3 and as previously described, the unit mounting pans 100 and the members 102 carrying the vertical bus insulators are vertically displaced from each other. Thus if stab-in connectors, not shown, which are conventionally carried on the control units which are inserted into the structure 10 are properly positioned to engage the vertical bus bars 106 at locations intermediate adjacent openings 90 and 92, proper electrical clearance will be provided between the stab-in connectors and the unit pans 100 as well as the vertically spaced members 102 when the control units are inserted into the structure 10.

Additionally, as shown in FIG. 3, the lower member 102 supports a cover pan 148 which surrounds the lower ends of the bus bars 106. The pan 148 is provided to prevent accidental contact with the vertical bus bars 106 during installation of the wires in the lower wiring trough 112. It will be seen that the lower wiring trough 112 and the upper wiring trough 84 extend entirely across the enclosure between the walls 12. Thus when additional structures 10 are placed adjacent to each other the openings 84 will permit horizontal wiring between the adjacent sections of the control center.

The embodiment illustrated in FIG. 9 is substantially identical to that disclosed in FIG. 8, with the exception that the portions to the rear of the vertically spaced members 102 are omitted and replaced by the panel member 17. Secured on the inner face of the panel member 17 are a pair of vertically extending bracket members 136 each of which is provided with vertically spaced openings located at $2T-B$ inches so that the panel member 17 and the members 102 may be secured together by screws 101 passing through the openings in angle members 136 in the same manner as the screws 101 passing into the openings 90 secure the members 28 and 36 to the member 102 in FIG. 8.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electrical enclosure structure comprising: a housing having a vertically extending front opening, a first member extending horizontally across a top portion of the opening, said first member having a height equal to T inches, a second member extending across a bottom portion of the opening, said second member having a height less than T inches and equal to B inches, and a pair of identical oppositely facing spaced members each providing a front edge for the opening and a side wall portion for the housing, said members each extending along a vertical axis and having a central located on the axis spaced equidistantly from the opposite ends of the members and formed so the portions of the members extending in opposite directions from the center are symmetrical with each other, each of said members having a predetermined number of openings spaced at centers located $2(T-B)$ inches from each other along the axis over the length of the member between the first and the second members with the centers located so that the symmetrical portions of the members include symmetrically located openings.

2. An electrical enclosure structure comprising: a housing having a vertically extending front opening, a first member extending horizontally across a top portion of the opening, said first member having a height equal to T inches, a second member extending across a bottom portion of the opening, said second member having a height less than T inches and equal to B inches, and a pair of identical oppositely facing spaced members each providing a front edge for the opening and a side wall portion for the housing, said members each extending along a vertical axis and having a center located on the axis spaced equidistantly from the opposite ends of the members and formed so the portions of the members extending in opposite directions from the center are symmetrical with each other, each of said members having a predetermined number of openings spaced at centers located $(T-B)$ inches from each other along the axis over the length of the member between the first and the second members with the centers located so that the symmetrical portions of the members include symmetrically located openings.

3. An electrical enclosure structure comprising: a rectangular housing having a pair of spaced side walls defining a pair of oppositely facing identical openings, a pair of identical cover members each extending horizontally between the walls across a top portion of each of the pair of vertical openings, said cover members each having a height of T inches so a top portion equal to T inches of each of the pair of vertical openings is closed by a cover member, a pair of identical closure members each extending horizontally between the walls across a bottom portion of each of the pair of vertical openings, said closure members each having a height less than T inches and equal to B inches so a bottom portion equal to B inches of each of the pair of vertical openings is closed by a closure member, four horizontally spaced vertically extending identical members each having a formed front edge and an outer surface extending from the formed edges, said members being grouped to provide two identical pairs of members with the outer surfaces of the members in each of the two pairs facing in opposite directions and the formed edge of the members in each of the two pairs facing in the same direction, said two pairs of members being horizontally spaced and extending along a vertical axis to define the four corners and side wall portions of the rectangular housing and the pair of vertical openings, said members having a center located on the axis spaced equidistantly from the opposite ends of the members and formed so the portions of the members extending in opposite directions from the center are symmetrical with each other, each of said members having a predetermined number of openings spaced at centers located $(T-B)$ inches from each other along the axis over the length of the members between the cover and the closure members with the centers located so that the symmetrical portions of the members include symmetrically located openings, and means including a plurality of doors each having a height substantially equal to a whole number multiple of $(T-B)$ inches for closing portions of both of the pair of vertical openings and means secured in at least two of openings for hingedly mounting each of the doors on the vertical members.

4. The structure as defined in claim 1 including a plurality of vertically spaced doors hinged on one of said members, each of said doors having a height substantially equal to a whole number multiple of $(T-B)$ inches.

5. The structure as defined in claim 1 including a plurality of vertical bus bars in the housing and a plurality of horizontally extending members supporting the bus bars in the housing, said bus bars supporting members being vertically spaced from each other a whole number multiple of $(T-B)$ inches.

6. The structure as defined in claim 1 including a plurality of units to be inserted and withdrawn through a front portion of the vertical opening and a plurality of horizontally extending pans each supporting one of the units and detachably mounted in the housing at vertically spaced intervals equal to a whole number multiple of $(T-B)$ inches.

7. The structure as recited in claim 3 including a plurality of vertical bus bars in the housing extending in a vertical plane equidistant between the pair of vertical openings and a plurality of horizontally extending members supporting the bus bars in the housing, said bus bars supporting members extending between the side walls of the housing and being vertically spaced from each other a whole number multiple of $(T-B)$ inches.

8. The structure as defined in claim 3 including a plurality of units to be inserted and withdrawn through a front portion of each of the vertical openings and a plurality of horizontally extending pans each supporting one of the units and detachably mounted in the housing at vertically spaced intervals of a whole number multiple of $(T-B)$ inches.

9. An electrical enclosure structure comprising: a housing having a rectangular front opening vertically extending 90 inches between a pair of spaced side wall members, a first member extending horizontally across a top portion of the front opening, said first member having a height equal to T inches so a top portion of the front opening vertically equal to T inches is closed by the first member, a second member extending horizontally across a bottom portion of the front opening, said second member having a height less than T inches and equal to B inches so a bottom portion of the front opening vertically equal to B inches is closed by the second member, means including a plurality of vertically spaced openings in the side wall members located at intervals of $(T-B)$ inches from each other for vertically dividing the front opening into 14 unit spaces each having a height of U inches wherein $T+B+14U$ equals the vertical height of the vertical opening, a closure member extending horizontally between the side wall members across a portion of the front opening immediately vertically below the first member, said closure member having a height equal to $(T-B)$ inches, a plurality of mounting pans detachably mounted in the housing by the vertically spaced openings at vertically spaced intervals of whole number multiples of $(T-B)$ inches, a plurality of switch unit assemblies each having a height substantially equal and slightly less than the height of the vertical spacings between the mounting pans, each of said units having a bottom surface resting on one of the pans and sized to be inserted and withdrawn from the housing through a front portion of the front opening, and at least one of said units being positioned in a space immediately below the closure member and having a switch operator extending external of the front opening when the said one unit is inserted in the housing, said operator being vertically movable for operating a switch carried by the said one unit to a position whereat the handle has a center located aproximately 12 inches below the top of the vertical opening when the handle is moved upwardly to a maximum vertical position for operating a switch unit in the said one unit to a circuit making position, a plurality of additional closure members closing portions of the front opening located between the first mentioned closure member and the second member, each of said additional closure members having a height substantially equal and slightly less than a whole number multiple of $(T-B)$ inches and at least one of said additional closure members consisting of a door having a first side hinged on one of the side wall members and a second side movable from an open position whereby the said one unit may be withdrawn and inserted into the housing to a closed position whereat a portion of the door abuts the side wall member of the pair of side wall members other than the said one side wall members, said door having a vertically extending opening therein having: a top edge located to pass the handle with clearance when the door is moved to the closed position and the handle is at the maximum vertical position and material having a vertical height substantially equal to ¾ inch between the top edge of the opening and a top edge of the door, and means including a plurality of equidistantly spaced vertically aligned openings spaced vertically at centers located $(T-B)$ inches from each other over the entire length of the said one side wall member for hingedly mounting the first side of the door on the said one side wall member with one of said vertically aligned openings located at the vertical center of the said one side wall member.

10. The structure as defined in claim 9 including an additional side wall member that is identical to the said one side wall member, said additional member being horizontally spaced from the said other side wall member to provide the enclosure structure with a vertically extending wire trough that extends between the said other side wall member and the additional side wall member parallel to the front opening and having a top portion covered by the first member and a bottom portion covered by the second member to provide an uncovered portion between the first and the second members, a door closing the uncovered portion of the wire trough said door having a first side hinged on the additional side wall member and a second side movable from an open position for exposing the wire trough to a closed position whereat a portion of the second side abuts the said other side wall member, and means including a hinge having portions secured by the vertically aligned openings in the additional side wall member providing a hinged connection for the first side of the door.

References Cited

UNITED STATES PATENTS

| | | | |
|---|---|---|---|
| 2,999,190 | 9/1961 | Armandroff et al. | 317—120 |
| 3,140,426 | 7/1964 | Defandorf | 317—120 |
| 3,303,395 | 2/1967 | Eck | 317—120 |
| 3,308,348 | 3/1967 | Olashaw et al. | 317—119 |

LEWIS H. MYERS, Primary Examiner

GERALD P. TOLIN, Assistant Examiner

U.S. Cl. X. R.

317—117

PO-1050
(5/69)

UNITED STATES PATENT OFFICE
CERTIFICATE OF CORRECTION

Patent No. 3,495,135      Dated February 10, 1970

Inventor(s) Kenneth L. Paape

It is certified that error appears in the above-identified patent and that said Letters Patent are hereby corrected as shown below:

```
Col. 1, line 42, for "arraned" read --arranged--.
Col. 2, line 63, after "invention" cancel --on--.
Col. 3, line 7,  for "wal" read --wall--.
Col. 4, line 33, for "wil" read --will--;  line 61, for
                 "position" read --portion--.
Col. 6, line 49, for "14" read --114--;  line 55, for
                 "fastners" read --fasteners--.
Col. 7, line 14, for "asignee" read --assignee--.
Col.10, line 1,  for "clearance" read --clearances--; line 47,
                 for "central" read --center--.
```

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents